United States Patent
Walker et al.

(10) Patent No.: US 8,731,054 B2
(45) Date of Patent: May 20, 2014

(54) METHOD AND APPARATUS FOR WEIGHTED PREDICTION IN PREDICTIVE FRAMES

(75) Inventors: Gordon Kent Walker, Poway, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1384 days.

(21) Appl. No.: 11/120,513

(22) Filed: May 2, 2005

(65) Prior Publication Data

US 2005/0281334 A1 Dec. 22, 2005

Related U.S. Application Data

(60) Provisional application No. 60/568,154, filed on May 4, 2004.

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |

(52) U.S. Cl.
USPC .................................................. 375/240.12

(58) Field of Classification Search
USPC .................................................. 375/240.15
See application file for complete search history.

(56) References Cited

U.S. PATENT DOCUMENTS

| 6,151,075 | A * | 11/2000 | Shin et al. ...................... 348/459 |
| 6,167,084 | A * | 12/2000 | Wang et al. ................ 375/240.02 |
| 6,944,226 | B1 * | 9/2005 | Lin et al. ..................... 375/240.2 |
| 6,965,328 | B2 * | 11/2005 | Ji ..................................... 341/50 |
| 7,308,145 | B2 * | 12/2007 | Abe et al. ..................... 382/233 |
| 7,376,186 | B2 * | 5/2008 | Boyce et al. ............. 375/240.15 |
| 2004/0008782 | A1 | 1/2004 | Boyce et al. |
| 2004/0240556 | A1 * | 12/2004 | Winger et al. ........... 375/240.18 |
| 2004/0246373 | A1 * | 12/2004 | Kadono et al. ............. 348/384.1 |

FOREIGN PATENT DOCUMENTS

| CL | 1040-2005 | 5/2005 |
| CL | 1041-2005 | 5/2005 |
| CL | 1043-2005 | 5/2005 |
| CL | 1046-2005 | 5/2005 |

(Continued)

OTHER PUBLICATIONS

Wiegand et al., Draft ITU-T Recommendation and Final Draft International Standard of Joint Video Specification (ITU-T Rec. H.264 | ISO/IEC 14496-10 AVC), May 27, 2003.*

(Continued)

*Primary Examiner* — Mehrdad Dastouri
*Assistant Examiner* — Kristin Dobbs
(74) *Attorney, Agent, or Firm* — Brent A. Boyd

(57) ABSTRACT

A method and apparatus for constructing weighted bi-directional predicted video pictures including locating first and second prediction regions in first and second reference frames, receiving first and second weight parameters related to the first and second prediction regions, where the weight parameters and weighting methodology used to encode the weight parameters can be from several different codec designs for weighted bi-directional prediction. Further including, modifying the weight parameters to conform to a bit configuration and weighting methodology, applying the weight parameters to the first and second prediction regions and combining them to form a weighted bi-directional predicted picture. The bit configuration being chosen to accommodate multiple encoded bit configurations and methodologies, where the encoded bit configurations and methodologies can differ in characteristics such as, for example, bit size, being signed or unsigned, and supporting offsets.

64 Claims, 10 Drawing Sheets

(56) References Cited

FOREIGN PATENT DOCUMENTS

| EP | 1365591 | 11/2003 |
|----|---------|---------|
| EP | 1439709 | 7/2004 |
| JP | 08-097725 | 4/1996 |
| KR | 2003-0083760 | 10/2003 |
| WO | WO2004015999 | 2/2004 |

OTHER PUBLICATIONS

Kikuchi et al., "Improved Multiple Frame Motion Compensation Using Frame Interpolation," Joint Video Team (JVT) of ISO/IEC MPEG & ITU-T VCEG, XP-002340658 (2002).

Oualline, "Practical C Programming," O'Reilly, XP-002340738 (1997).

Talla et al., "Anatomy of a Portable Digital Mediaprocessor," IEEE Computer Society, XP-002340656 (2004).

Tung et al., "DSP-Bsed Multi-Format Video Decoding Engine for Media Adapter Applications," IEEE Transactions on Consumer Electronics, XP-002341502 (2005).

Wiegand et al., Draft ITU-T Recommendation anf Final Draft International Standard of joint Video Specification (ITU-T Rec. H.264 | ISO/IEC 14496-10 AVC), XP-002328607 (2003).

Yang et al., "Design of a Multi-Function Video Decoder Based on a Motion-Compensated Predictive-Interpolative Coder," Proceedings of the SPIE, XP-000987352 (1990).

International Search Report—PCT/US05/015449, International Search Authority—European Patent Office, Sep. 12, 2005.

Written Opinion—PCT/US05/015449, International Search Authority—European Patent Office, Sep. 12, 2005.

Wiegand et al., "Draft ITU-T Recommendation and Final Draft International Standard of Joint Video Specification", (ITU-T Rec. h.264 (May 2003) | ISO/IEC 14496-10 AVC), Geneva May 27, 2003.

European Search Report—EP10167473—Search Authority—Munich—Nov. 18, 2011.

Taiwan Search Report—TW094114428—TIPO—Sep. 20, 2011.

\* cited by examiner

METHOD AND APPARATUS FOR WEIGHTED PREDICTION IN PREDICTIVE FRAMES

CLAIM OF PRIORITY UNDER 35 U.S.C. §119

The present Application for patent claims priority to Provisional Application No. 60/568,154 entitled "Method and Apparatus for Weighted Prediction in Predictive Frames" filed May 4, 2004, and assigned to the assignee hereof and hereby expressly incorporated by reference herein.

BACKGROUND

1. Field

This invention relates to methods and apparatus for decoding compressed video data where various weighted prediction methods were used for encoding the video data.

2. Background

There are spatial, temporal and signal to noise ratio (SNR) scalabilities in hybrid coders like MPEG-1, MPEG-2, MPEG-4 (collectively designated MPEG-x), H.261, H.262, H.263, and H.264 (collectively designated H.26x). In hybrid coding, temporal redundancy is removed by motion-compensated prediction (MCP). A video is typically divided into a series of groups of pictures (GOP), where each GOP begins with an intra-coded frame (I) followed by an arrangement of forward or backward predictive-coded frames (P) and bi-directional predicted frames (B). Both P-frames and B-frames are inter-frames.

B-frames provide significant reduction in bit-rate, and also provide capability of temporal scalability (i.e., bi-directional prediction could be introduced for frames in between I-frames and P-frames optionally, and the bit-stream would be playable even without the B-frames, but temporal smoothness and higher frame rate would be observed if B-frames were included in the decoding and playback). B-frames are predicted from multiple frames and can be computed from a simple average of the frames from which they are predicted. However, B-frames are also computed using weighted prediction such as a time based weighted average or a weighted average based on a parameter such as luminance. Weighted prediction places more emphasis on one of the frames or on certain characteristics of the frames and is used to more efficiently predict B-frames. Different codecs implement weighted prediction in different ways. Real Video 9 provides a 14-bit unsigned weighting factor to be multiplied by the individual forward and backward predictions, and also provides for a direct mode where temporal weights are derived based on relative temporal positions of the B-frame with respect to the two reference frames. MPEG-4, in the Simple Scalable Profile, provides for simple averaging of the past and future reference frames. Windows Media Video 9 also provides for simple averaging as in MPEG-4. H.264 weighted prediction provides for simple averaging of past and future frames, direct mode weighting based on temporal distance to past and future frames, and weighted prediction based on luminance (or other parameter) of past and future frames.

As discussed above, the different video codec implementations can each have different weighting modes, such as direct mode, luminance weighting and simple averaging, as well as different bit allocations for weighting factors. A single decoder design to handle decoding multiple types of weighted bi-directional predictive video bitstreams is desired and would result in highly efficient and less costly design of software, firmware and hardware.

SUMMARY

A video decoding system that enables decoding of weighted bi-directional predicted encoded video through use of innovative digital signal processing is described. The efficient and innovative decoder design allows decoding of multiple weighted bi-directional encoding schemes with a single decoder. A pre-processor identifies weighting factors used in the particular encoding scheme and modifies the weight factors to conform to a universal bit configuration for decoding with a universal formula.

DETAILED DESCRIPTION

Figure 1:
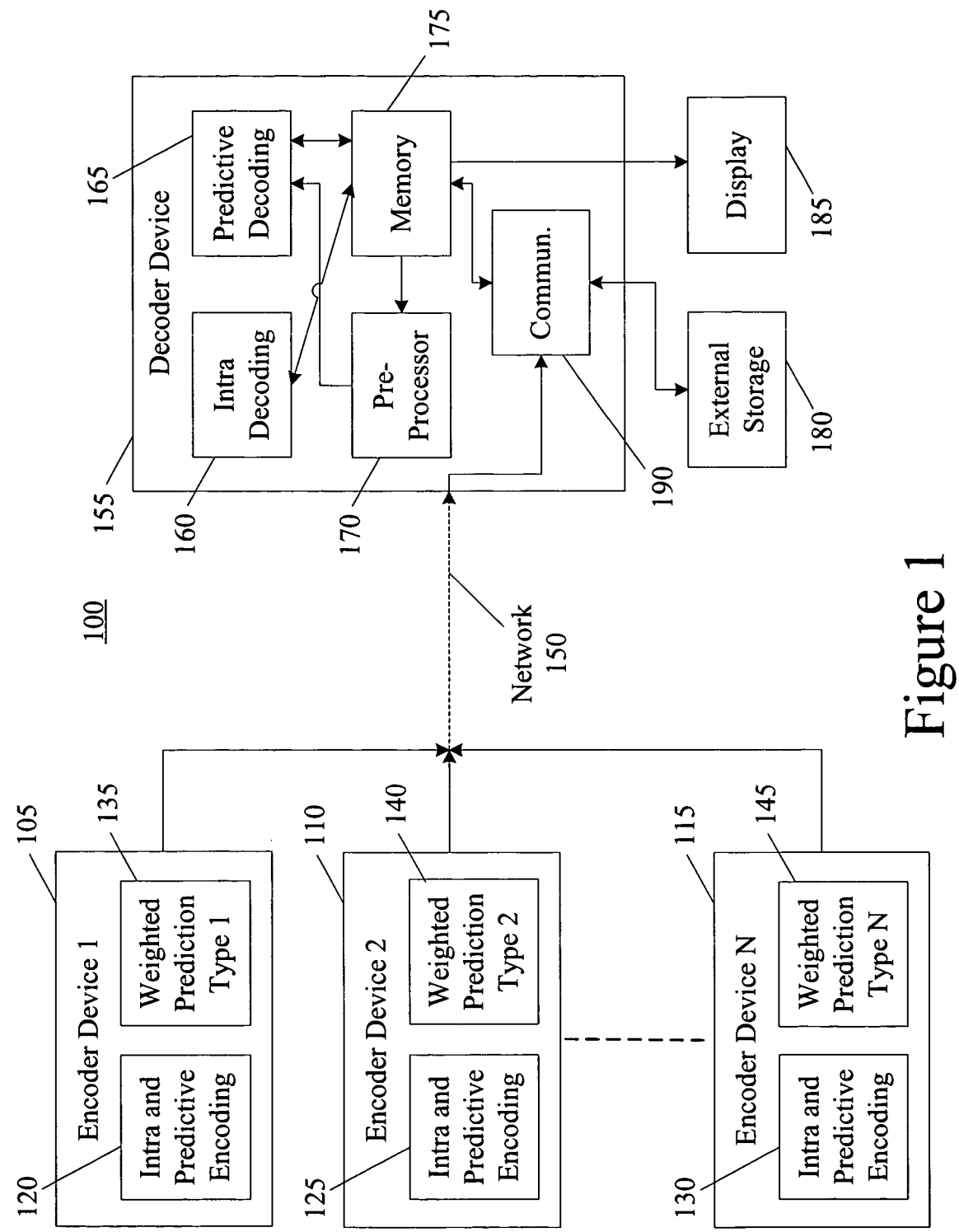
FIG. 1 is a block diagram of a general communications system for encoding and decoding streaming pictures.

It is noted that the examples may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

A method, apparatus and system to reconstruct weighted bi-directional predicted video data are described. A single decoder can decode weighted bi-directional predicted video data that has been encoded with different implementations of weighted bi-directional prediction. Further, the decoder complexity is kept to a minimum to reduce cost by making maximum reuse of the decoder software, firmware or hardware for decoding the different implementations of weighted bi-directional predicted video data.

A pair of video coding standards, known as MPEG-x and H.26x, describe data processing and manipulation techniques (referred to herein as hybrid coding) that are well suited to the compression and delivery of video, audio and other information using fixed or variable length source coding techniques. In particular, the above-referenced standards, and other hybrid coding standards and techniques, compress data such as video information using intra-frame coding techniques (such as, for example, run-length coding, Huffman coding and the like) and inter-frame coding techniques (such as, for example, forward and backward predictive coding, motion compensation and the like). Specifically, in the case of video processing systems, Hybrid video coding systems are characterized by prediction-based compression encoding of video frames with intra- and/or inter-frame motion compensation encoding.

Intra-frame coding refers to encoding a picture (a field or a frame) without reference to any other picture, but the Intra-coded picture can be used as a reference for other pictures. The terms intra-frame, intra-coded frame and I Frame are all examples of video-objects formed with intra-coding that are used throughout this application.

Inter or predictive coding refers to encoding a picture (a field or a frame) with reference to another picture. Compared to the Intra-coded picture, the Inter-coded or predicted picture may be coded with greater efficiency. Examples of inter-coded pictures that will be used throughout this application are predicted frames (either forward or backward predicted, also referred to as P frames), and bi-directional predicted frames (also referred to as B Frames). Other terms for inter-coding include high-pass coding, residual coding, motion compensated interpolation and others that are well known to those of ordinary skill in the art.

FIG. 1 is a block diagram of a general communications system for encoding and decoding streaming pictures. The system 100 includes multiple types of encoder devices 105, 110 and 115 and a decoder device 155. The encoder devices each contain intra-coding and predictive coding modules 120, 125 and 130, respectively. These coding modules perform the various types of encoding including intra-coded and inter-coded pictures as discussed above. The encoder devices each contain a different type of weighted prediction module 135, 140 and 145, respectively. Each weighted prediction module performs weighted bi-directional prediction by one of a plurality of methods. These weighted prediction methods have differences in the way that the weights and other parameters are represented. The data that the encoder devices generate is transmitted over a network 150. Network 150 can be part of a wired system such as telephone, cable, and fiber optic, or a wireless system. In the case of wireless, communication systems, network 150 can comprise, for example, part of a code division multiple access (CDMA or CDMA2000) communication system or alternately, the system 100 can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1×EV-DO or 1×EV-DO Gold Multicast) system, or in general any wireless communication system employing a combination of techniques.

Decoder device 155 can receive the various encoded data directly over the network 150 or receive it from memory module 175 or external memory storage module 180 after the data has been stored there by an encoder or other intermediary device. Decoder device 155 includes intra-decoding module 160, predictive decoding module 165, preprocessor module 170, memory module 175 and communication component 190. Communications component 190 contains logic used for receiving encoded data in conjunction with network 150, as well as logic for receiving encoded data from external storage 180 or memory module 175. Intra-decoding module 160 and predictive decoding module 165 decode the received intra-coded and inter-coded data, respectively. Predictive decoding module 165 includes logic to decode all of the various types of weighted prediction encoded by weighted prediction modules 135, 140 and 145. Instead of having separate sections of code to decode the various types of weighted prediction, decoder device 155 utilizes a pre-processor module 170 to manipulate the weighted prediction parameters such that a single method of decoding can be used to decode all of the types of weighted prediction. After decoding, decoder device 155 can store the picture data on memory module 175 or external storage module 180, or display it on display 185. Display 185 can be integrated in the decoder device, as in a telephone or personal digital assistant (PDA) or can be a separate peripheral device. The encoding, decoding, pre-processing and weighted prediction processes performed by the encoder and decoder devices are more fully described below.

Figure 2A:
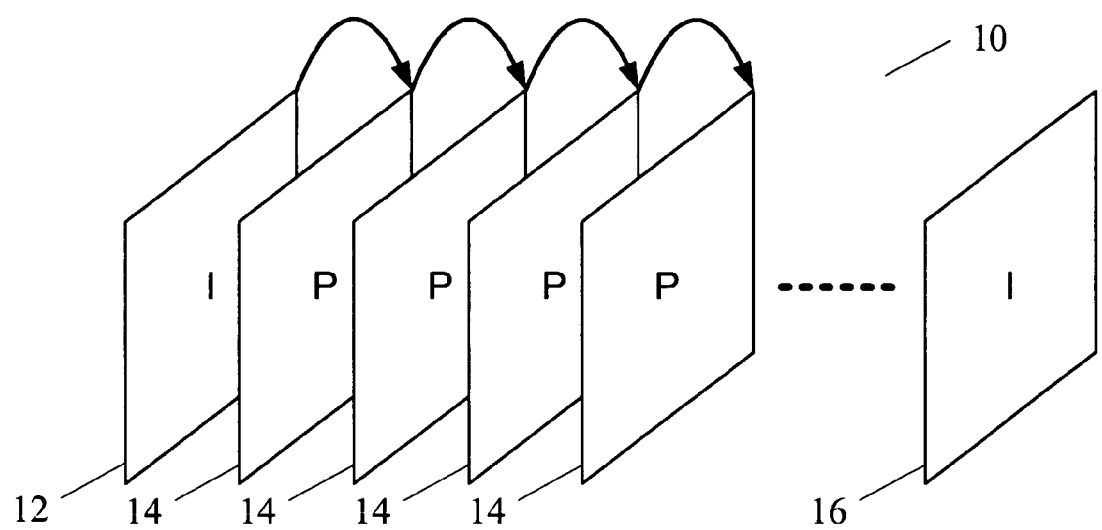
FIG. 2A is a diagram illustrating a conventional MPEG-4 Simple Profile data stream.

In a typical MPEG decoder, predictive coded pixel blocks (i.e., blocks that comprise one or more motion vectors and a residual error component) are decoded with respect to a reference frame (where an intra-frame or another predicted frame can serve as a reference frame). FIG. 2A is a diagram illustrating a conventional MPEG-4 Simple Profile data stream, which depicts frame dependencies for a GOP. GOP 10 is made up of initial I Frame 12, followed by several forward predicted P frames 14.

Figure 2B:
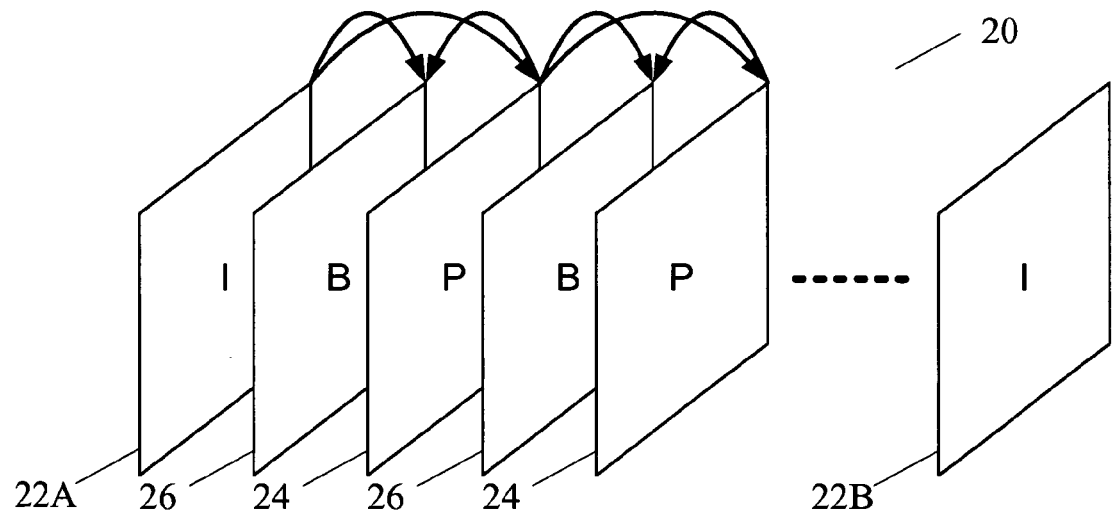
FIG. 2B is a diagram illustrating a conventional encoded data stream including bi-directional predicted frames.

FIG. 2B is a diagram illustrating a conventional encoded data stream including bi-directional predicted frames, which depicts the frame dependencies of a GOP. GOP 20 is made up of I frame 22A, forward predicted P frames 24, and bi-directional predicted B frames 26. Each B frame can combine forward and backward motion vectors and residual errors referenced to I frame 22A or predicted P frames 24 (backward predicted P frames could also be used but are not shown in this example). I frame 22B marks the beginning of the next GOP.

FIGS. 3, 4, 5 and 7 illustrate various inter-coding processes including those used for constructing P Frames, B Frames, weighted B Frames and H.264 predicted frames. The encoder devices 105, 110 and 115 and the decoder device 155 depicted in FIG. 1 can perform these processes in whole or in part.

Figure 3:
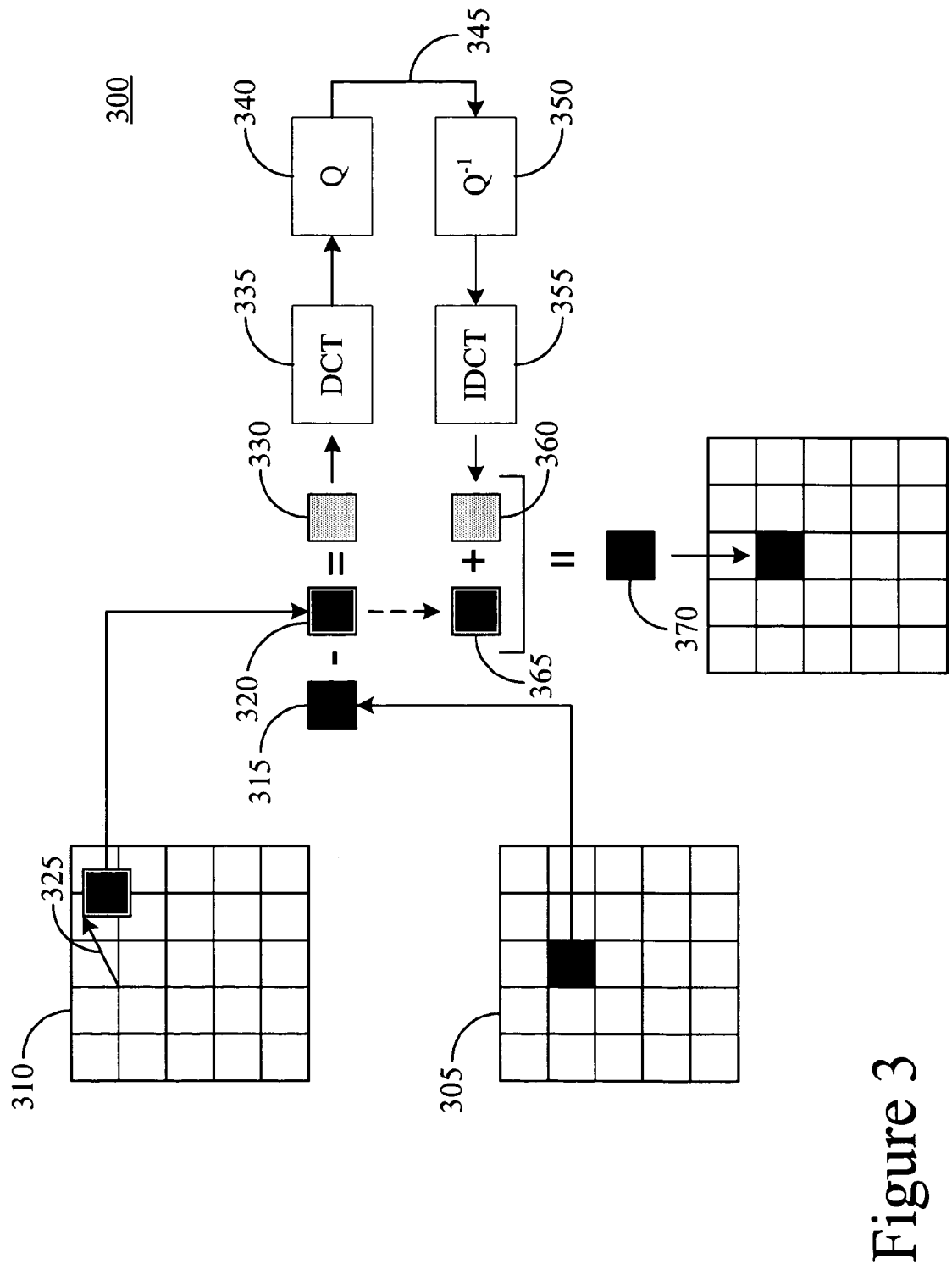
FIG. 3 is an illustration of an example of a P Frame construction process in MPEG-4.

P Frames (or any inter-coded sections) can exploit temporal redundancy between a region in a current picture and a best matching prediction region in a reference picture. The location of the best matching prediction region in the reference frame can be encoded in a motion vector. The difference between the current region and the best matching reference prediction region is known as residual error (or prediction error). FIG. 3 is an illustration of an example of a P Frame construction process in, for example, MPEG-4. Process 300 includes current picture 305 made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 315 of current picture 305 is predicted from reference picture 310 at a different time point than current picture 305. A search is made in reference picture 310 to locate best matching macroblock 320 that is closest, in terms of Y, Cr and Cb values to current macroblock 315 being encoded. The location of best matching macroblock 320 in reference picture 310 is encoded in motion vector 325. Reference picture 310 can be an I Frame or P Frame that the decoder will have reconstructed prior to the construction of current picture 305. Best matching macroblock 320 is subtracted from current macroblock 315 (a difference for each of the Y, Cr and Cg components is calculated) resulting in residual error 330. Residual error 330 is encoded with 2D Discrete Cosine Transform (DCT) 335 and then quantized 340. Quantization 340 can be performed to provide spatial compression by, for example, allotting fewer bits to the high frequency coefficients while allotting more bits to the low frequency coefficients. The quantized coefficients of residual error 330, along with motion vector 325 and reference picture 310 identifying information, are encoded information representing current macroblock 315. The encoded information can be stored in memory for future use or operated on for purposes of, for example, error correction or image enhancement, or transmitted over network 345.

The encoded quantized coefficients of residual error 330, along with encoded motion vector 325 can be used to reconstruct current macroblock 315 in the encoder for use as part of a reference frame for subsequent motion estimation and compensation. The encoder can emulate the procedures of a decoder for this P Frame reconstruction. The emulation of the decoder will result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 350 and then 2D Inverse DCT, or IDCT, 355 is performed resulting in decoded or reconstructed residual error 360. Encoded motion vector 325 is decoded and used to locate the already reconstructed best matching macroblock 365 in the already reconstructed reference picture 310. Reconstructed residual error 360 is then added to reconstructed best matching macroblock 365 to form reconstructed macroblock 370. Reconstructed macroblock 370 can be stored in memory, displayed independently or in a picture with other reconstructed macroblocks, or processed further for image enhancement.

Figure 4:
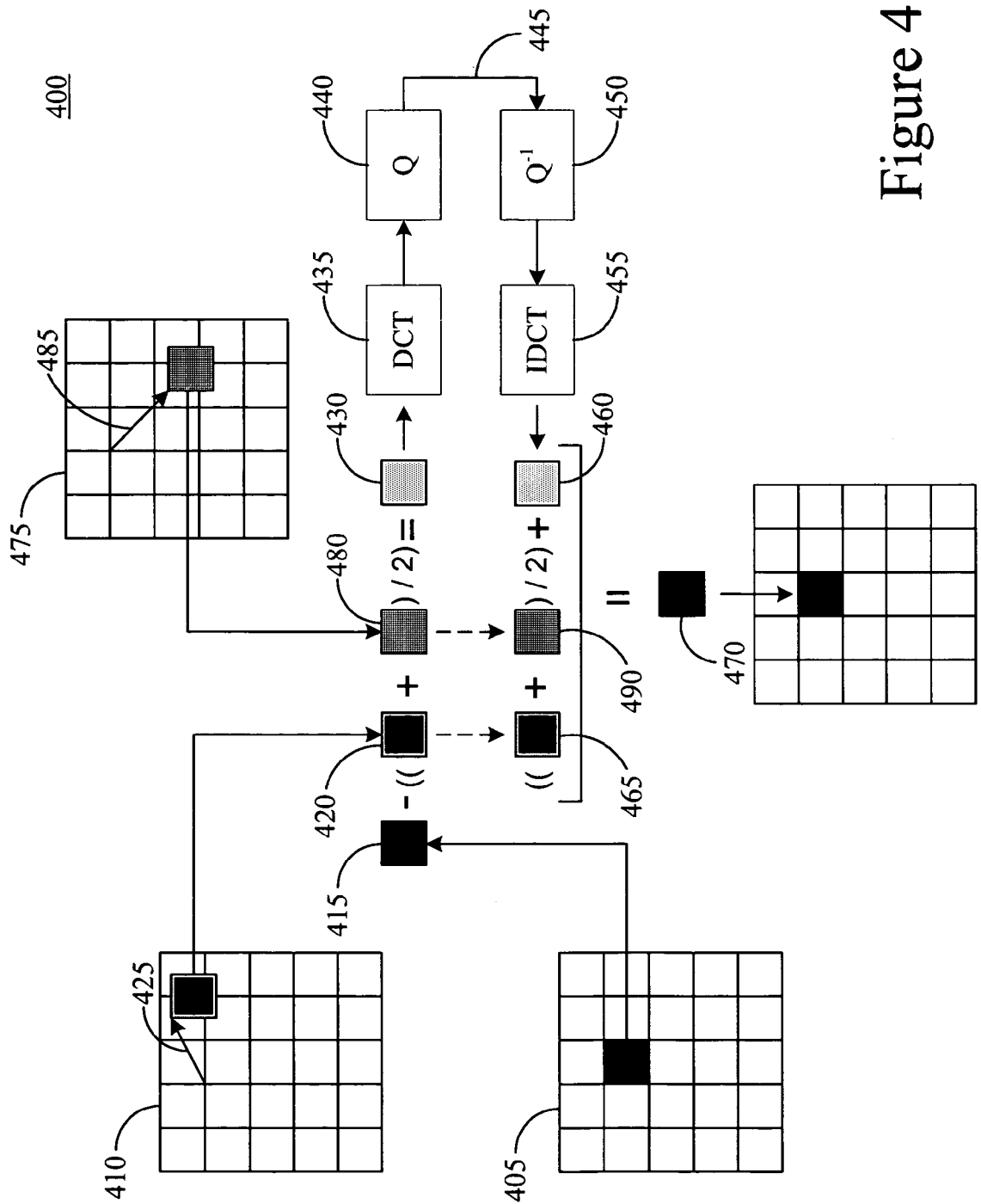
FIG. 4 is an illustration of an example of a B Frame construction process in MPEG-4.

B Frames (or any section coded with bi-directional prediction) can exploit temporal redundancy between a region in a current picture and a best matching prediction region in a previous picture and a best matching prediction region in a subsequent picture. The subsequent best matching prediction region and the backward best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors. FIG. 4 is an illustration of an example of a B Frame construction process in, for example, MPEG-4. Process 400 includes current picture 405 made up of 5×5 macroblocks, where the number of macroblocks in this example is arbitrary. Encoding macroblock 415 of current picture 405 is predicted in reference to previous reference picture 410 at a previous time point than current picture 405 and in reference to subsequent reference picture 475 at a subsequent time point. A search is made in previous reference picture 410 to locate best matching macroblock 420 that is closest to current macroblock 415 being encoded. The location of best matching macroblock 420 is encoded in motion vector 425. Previous reference picture 410 can be an I Frame or P Frame that the decoder will have reconstructed prior to the construction of current picture 405. A search is made in subsequent reference picture 475 to locate best matching macroblock 480 that is closest to current macroblock 415. The location of best matching macroblock 480 is encoded in motion vector 485. Subsequent reference picture 475 can be an I Frame or P Frame that the decoder will have reconstructed prior to the construction of current picture 405. Best matching macroblock 420 and best matching macroblock 480 are averaged to form a combined bi-directional macroblock that is subtracted from current macroblock 415 resulting in residual error 430. Other methods of combining the best matching macroblocks are discussed below. Residual error 430 is encoded with, for example, DCT 435 (other 2D transforms include a Hadamard transform or an integer transform as in H.264) and then quantized 440. The quantized coefficients of residual error 430, along with motion vectors 425 and 485 and reference picture identifying information, are encoded information representing current macroblock 415. The encoded information can be stored in memory for future use or operated on for purposes of, for example, error correction or image enhancement, or transmitted over network 445.

Since a B Frame is not used as a reference frame, in order to retain its temporal scaling property, macroblock reconstruction for B Frames may not be needed in an encoder. In a decoder, reconstruction of a B Frame section can be started after both the previous reference frame (or a portion of a picture or frame that is being referenced) and the subsequent reference frame (or a portion of a picture or frame that is being referenced) are reconstructed. The encoded quantized coefficients are dequantized 450 and then 2D IDCT 455 is performed resulting in decoded or reconstructed residual error 460. Encoded motion vectors 425 and 485 are decoded and used to locate the already reconstructed best matching macroblock 465 in the already reconstructed previous reference frame 410, and to locate the already reconstructed best matching forward macroblock 490 in subsequent reference frame 475. Reconstructed best matching macroblocks 465 and 490 are averaged to form a combined bi-directional macroblock. Reconstructed residual error 460 is then added to the combined bi-directional macroblock to form reconstructed macroblock 470. Reconstructed macroblock 470 can be stored in memory, displayed independently or in a picture with other reconstructed macroblocks, or processed further for image enhancement.

Figure 5:
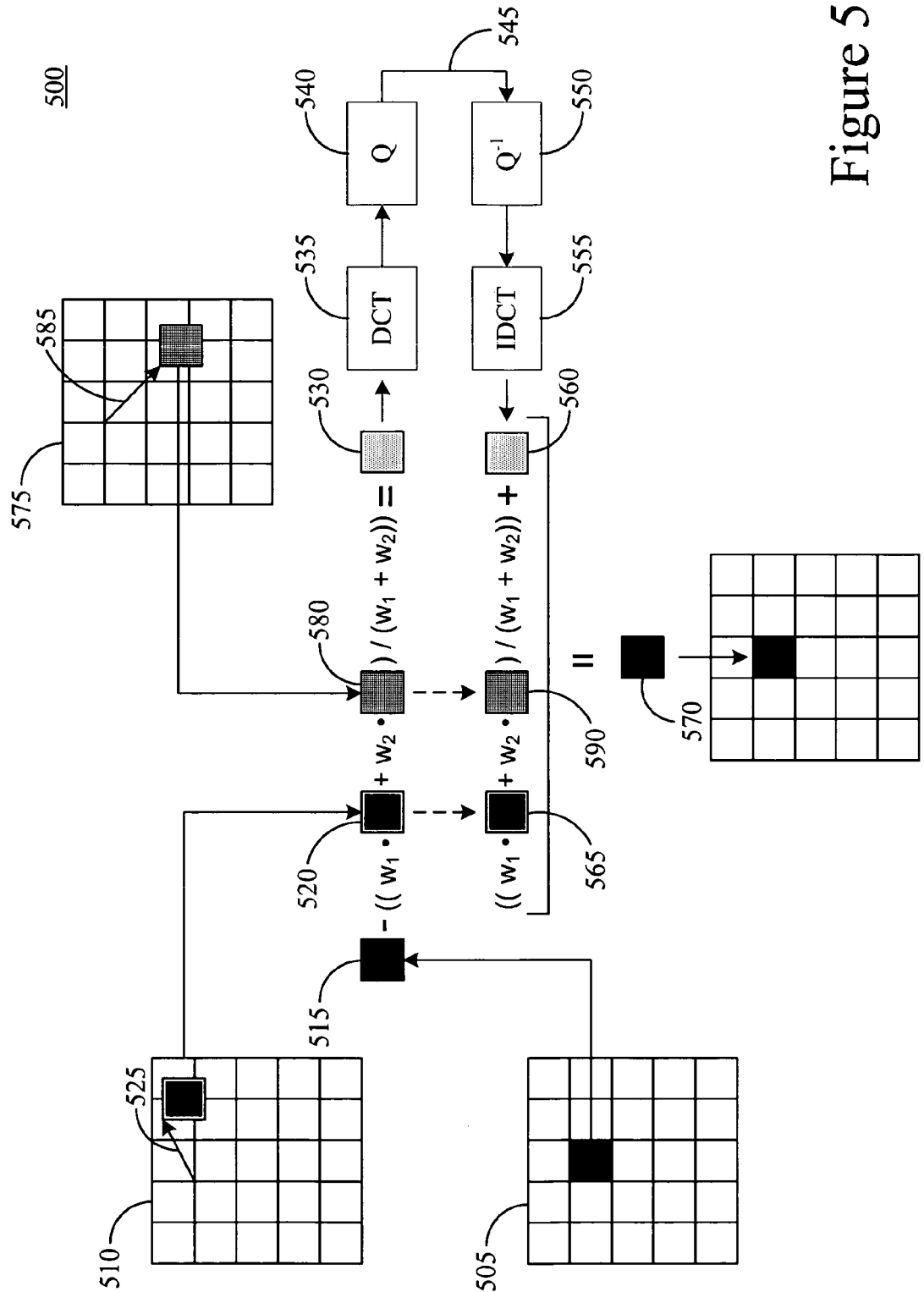
FIG. 5 is an illustration of an example of a weighted B Frame construction process.

B Frames (or any section coded with bi-directional prediction) can further exploit temporal redundancy by applying a weighting factor to one or both of the reference pictures before combining. The weighting factors can allow a better match to the section of the current picture, thereby reducing the residual error and, at the same time, reducing the bit-rate. In addition, weighting factors can be beneficial when one scene fades into another, or when a gradual variation in luminance exists such as fading to and/or from black or cross fades. FIG. 5 is an illustration of an example of a weighted B Frame construction process. Process 500 includes a current picture 505 made up of 5×5 macroblocks, where the number of macroblocks in this example is arbitrary. Encoding macroblock 515 of current picture 505 is predicted in reference to previous reference picture 510 at a previous time point than current picture 505 and in reference to subsequent reference picture 575 at a subsequent time point. A search is made in previous reference picture 510 to locate best matching macroblock 520 that is closest to current macroblock 515 being encoded. The location of best matching macroblock 520 is encoded in motion vector 525. Previous reference picture 510 can be an I Frame or P Frame that the decoder will have reconstructed prior to the construction of current picture 505. A search is made in subsequent reference picture 575 to locate best matching macroblock 580 that is closest to current macroblock 515. The location of best matching macroblock 580 is encoded in motion vector 585. The forward reference picture can be an I Frame or P Frame that the decoder will have reconstructed prior to the construction of current picture 505.

Weighting factors $w_1$ and $w_2$ can be chosen such that a weighted linear combination of the best matching subsequent and best matching previous macroblocks results in a smaller residual error than if equal weights were used as in FIG. 4. Weighting factor $w_1$ is multiplied by the Y, Cr and Cb values of best matching macroblock 520 to form a weighted best matching previous macroblock and weighting factor $w_2$ is multiplied by the Y, Cr and Cb values of best matching macroblock 580 to form a weighted best matching subsequent macroblock. The weighted best matching forward macroblock and the weighted best matching backward macroblock are combined to form a weighted combined bi-directional macroblock that is subtracted from current macroblock 515 resulting in residual error 530. Other methods of choosing the weights for combining the best matching forward macroblock and the best matching backward macroblock are discussed below. Residual error 530 is encoded with DCT 535 and then quantized 540. The quantized coefficients of residual error 530, motion vectors 525 and 585, weights and reference frame identifying information, are encoded information representing current macroblock 515. The encoded information can be stored in memory for future use or operated on for purposes of, for example, error correction or image enhancement, or transmitted over network 545.

Reconstruction of a B Frame section can be started after both the backward reference frame (or a portion of a picture or frame that is being referenced) and the forward reference frame (or a portion of a picture or frame that is being referenced) are reconstructed. The encoded quantized coefficients are dequantized 550 and then IDCT 555 is performed resulting in a decoded or reconstructed residual error 560. The encoded motion vectors 525 and 585 are decoded and used to locate the already reconstructed best matching macroblock 565 in previous reference picture 510, and to locate the already reconstructed best matching macroblock 590 in subsequent reference picture 575. The encoded weight $w_1$ is decoded and applied to reconstructed best matching previous macroblock 565 and the encoded weight $w_2$ is decoded and applied to reconstructed best matching subsequent macroblock 590 to form a combined weighted prediction macroblock. The reconstructed residual error 560 is then added to the combined weighted prediction macroblock to form reconstructed macroblock 570. Reconstructed macroblock 570 can be stored in memory, displayed independently or in a picture with other reconstructed macroblocks, or processed further for image enhancement.

The application of the weights $w_1$ and $w_2$ in FIG. 5 is shown as first multiplying the best matching reference macroblocks (i.e., the luminance (Y), and chrominance Cr and Cb (parameters), adding the multiplied macroblocks and then dividing by the added weights (normalizing the combined weighted prediction). The weights can also be derived with the normalization factor included. For example, the weight $w_1$ could be derived as being equal to $w_1/(w_1+w_2)$ and $w_2$ could be derived as being equal to $w_2/(w_1+w_2)$. These normalized weighting factors can then be used to modify the reference picture parameters and the modified parameters can then be added together and division by $(w_1+w_2)$ is not needed. Normalizing means such as pre-processor module 170 of FIG. 1 or pre-processor 810 of FIG. 8 can perform the normalizing function.

Deriving weights with the normalization factor included saves a division operation, and division is a complex operation in digital signal processing. Another way of normalizing without a division operation is by use of bit shifting. The weights can be derived with a common denominator and the division can be represented by a right shift of the combined weighted prediction a number of bits based on the base 2 logarithm of the denominator. For example, $w_1$ could be equal to 12 and $w_2$ could be equal to 4 and the denominator could be 16. The denominator of 16 would translate to a right shift of 4 bits. A right shift of 4 bits is equivalent to dividing by 16, thus $w_1$ would translate to a normalized weight of 0.75 and $w_2$ would translate to a normalized weight of 0.25.

Figure 6:
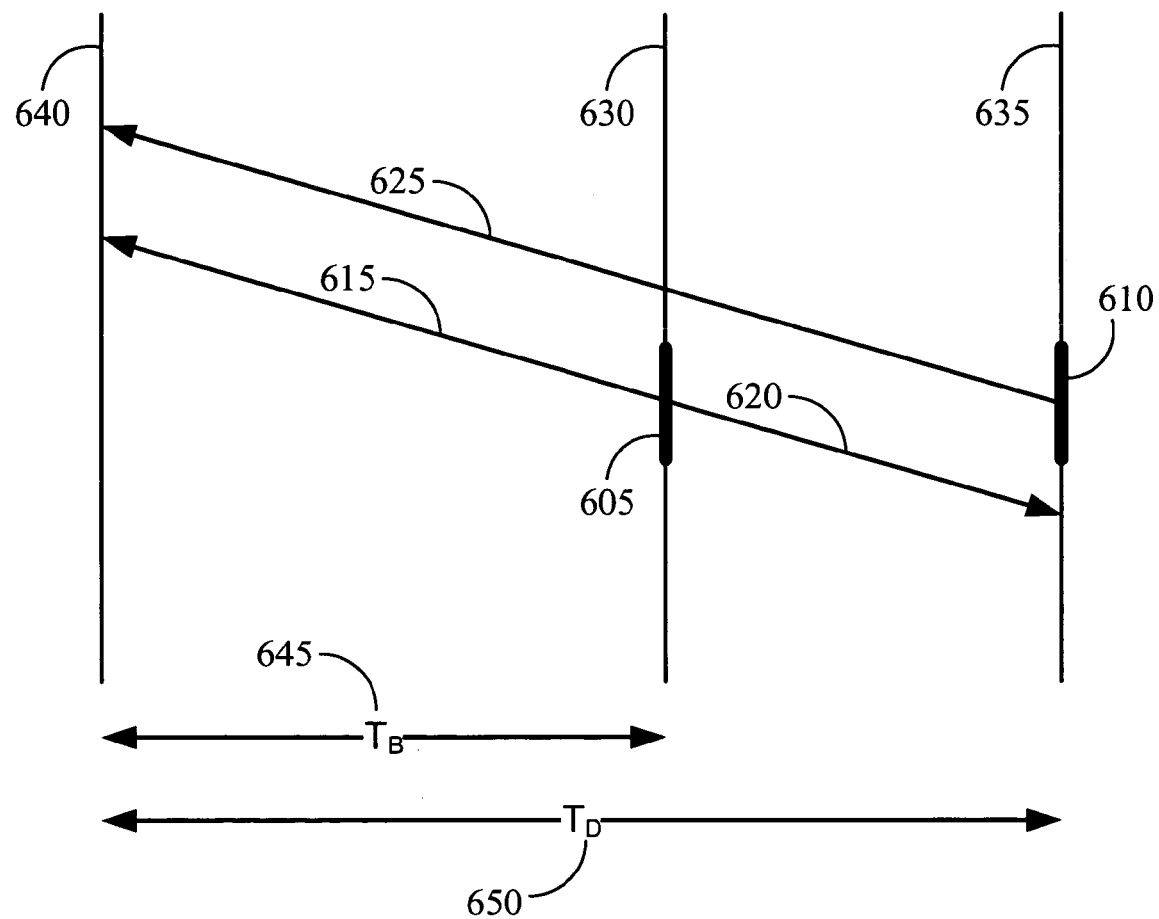
FIG. 6 is an illustration of an example of temporal prediction of weights used in direct mode bi-directional prediction of H.264.

Another method of deriving the weights can be used to perform a bi-directional prediction technique known as "direct mode" in H.264. In direct mode, motion vectors are not transmitted for the macroblock (or any other region such as a submacroblock) that is being bi-directionally predicted. Instead, the motion vectors are derived from a motion vector of a co-located macroblock from one reference frame to the other reference frame. The derivation of the motion vectors and the weights can based on the temporal location of the current frame to both the reference frames. FIG. 6 is a depiction of an example of temporal prediction of motion vectors and weights used in direct mode bi-directional prediction of H.264. Current macroblock 605 located in current frame 630 is formed by a linear combination of two macroblocks, one macroblock located in subsequent reference frame 635 and another macroblock located in previous reference frame 640. Forward motion vector $MV_0$ 615 and backward motion vector $MV_1$ 620 are derived from motion vector $MV_C$ 625 that locates the best matching macroblock in the previous reference frame for co-located macroblock 610 in the subsequent reference frame. The forward and backward motion vectors are calculated as:

$$MV_0 = \frac{TB}{TD} MV_C \quad (1)$$

$$MV_1 = \frac{TB - TD}{TD} MV_C \quad (2)$$

where TB 645 is the temporal distance between the current frame and the previous reference frame and TD 650 is the temporal distance between the previous reference frame and the subsequent reference frame. In one example, the best matching previous macroblock is modified by the weight $w_1$ and the best matching subsequent macroblock is modified by the weight $w_2$ where $w_1$ and $w_2$ are calculated as:

$$w_1 = (T_B/T_D) \quad (3)$$

$$w_2 = ((T_D - T_B)/T_D) \quad (4)$$

The modified macroblocks are then combined as discussed above and shown in FIG. 5. This example used a co-located macroblock in subsequent reference frame 635, but as one of ordinary skill in the art would know, a co-located macroblock in previous reference frame 640 could be used along with the motion vector referencing subsequent reference frame 635.

In addition, bi-directional construction could compute the combined bi-directional prediction based on either the forward or backward best matching macroblock alone (where one of the weights is set equal to zero), instead of the average macroblock technique as is depicted in FIG. 4 or the combined weighted prediction macroblock technique, where both weights are non-zero, as is depicted in FIG. 5.

Figure 7:
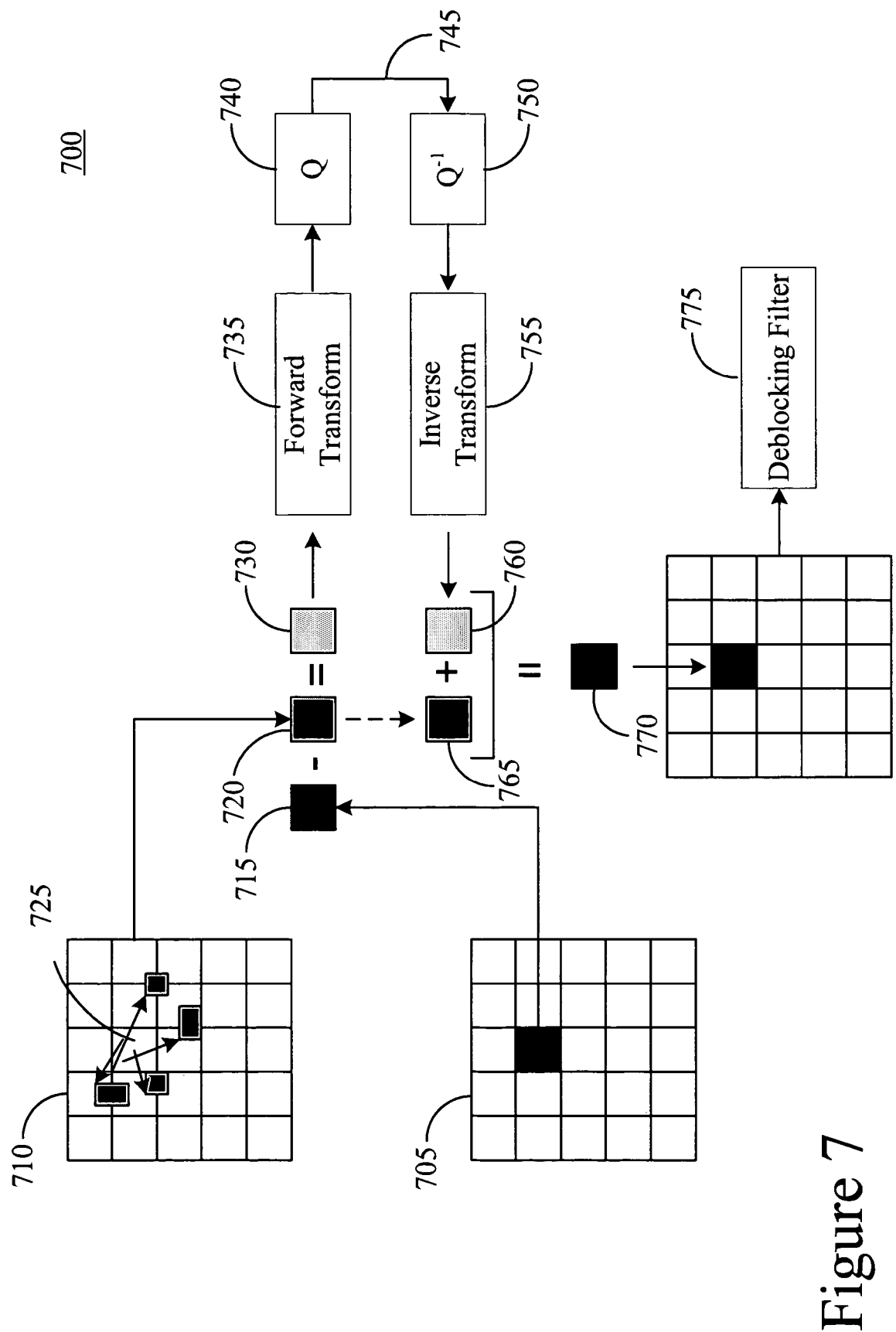
FIG. 7 is an illustration of an example of a P Frame construction process in H.264.

H.264 offers some options to the MPEG-4 examples of P Frame construction and B Frame construction discussed above. FIG. 7 is an illustration of an example of a P Frame construction process in H.264. Process 700 includes current picture 705 made up of 5×5 macroblocks, where the number of macroblocks in this example is arbitrary. Macroblock 715 of current picture 705 is predicted from reference picture 710 at a different time point than current picture 705. A macroblock can be divided into smaller sub-macroblock sections (for example, four sub-macroblocks are depicted in this example, but H.264 allows for sub-macroblock partitions as small as 4×4 pixels. Hence there can be 16 motion vectors for a single macroblock) and each sub-macroblock section can be exploited separately for temporal redundancy. A search is made in the reference picture to locate best matching sub-macroblocks for each sub-macroblock resulting in composite best matching macroblock 720 that is closest to current macroblock 715 being encoded. The location of the best matching macroblocks in the reference picture can be encoded in four motion vectors 725a-725d. The reference picture can be an I Frame or P Frame that the decoder will have reconstructed prior to the construction of current picture 705. The composite best matching macroblock 720 is subtracted from current macroblock 715 resulting in residual error 730. Residual error 730 can be encoded with slightly different forward 2D transform 735 than the DCT used in MPEG-4 and then quantized 740. The quantized coefficients of residual error 730, motion vectors 725a-725d and reference frame identifying information, are encoded information representing current macroblock 715. In the case of weighted bi-directional prediction frames with multiple sub-macroblock sections, the weights are also encoded. The encoded information can be stored in memory for future use or operated on for purposes of, for example, error correction or image enhancement, or transmitted over network 745.

The encoded quantized coefficients, motion vector, weights and residual error can also be used to reconstruct the current macroblock in the encoder for use as part of a reference frame for subsequent motion estimation and compensation. The encoder can emulate the procedures of a decoder for this P Frame reconstruction. The emulation of the decoder will result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 750 and then 2D Inverse Transform 755 is performed resulting in a decoded or reconstructed residual error 760. The encoded motion vectors 725a-725d are decoded and used to locate the already reconstructed best matching sub-macroblocks that make up reconstructed best matching composite macroblock 765. Reconstructed residual error 760 is then added to reconstructed best matching composite macroblock 760 to form reconstructed macroblock 770. Deblocking filter 775 can also be used as part of the encoding or decoding process for pixel enhancement such as, along the edges of the macroblocks or sub-macroblocks. The reconstructed macroblock can be stored in memory, displayed independently or in a picture with other reconstructed macroblocks, or processed further for image enhancement. Those of ordinary skill in the art will recognize that B Frame construction in H.264, including weighted bi-directional prediction, can also utilize multiple sub-macroblocks using similar methods.

Different encoders implement bi-directional prediction in different ways. As discussed above bi-directional prediction can be implemented as an average of two frames (a form of weighted bi-directional prediction where both weights equal one half), a weighted average of two frames or a temporally derived weighted average of two frames. In addition, different encoders can provide for weighted bi-directional prediction with different encoded bit configurations for the weight parameters. Weight parameter bit configurations can vary in ways such as, for example, the number of bits representing each weight and the use of signed or unsigned weight parameters. Some implementations also provide for an offset value added to the luminance or chrominance values. Bit configurations and offsets will be discussed in more detail below.

A versatile decoder, such as decoder device 155 depicted in FIG. 1, should be able to decode video that was encoded by multiple implementations with various encoded bit configurations and various types of weighted/non-weighted prediction methods. One way of accomplishing this versatility is by having different decoder modules for different encoder implementations and simply identifying the input to the decoder as being of one type or another and then use the decoder module designed for the specified encoder. This method is not efficient or cost effective. A more efficient decoder will reuse a single module to decode multiple encoder implementations. This can be accomplished through innovative preprocessing and module design features of the disclosed methods, which are discussed below.

The most prevalent weighted bi-directional prediction implementations will now be discussed. Digital signal processing functional symbols such as left bit shift (<<) and right bit shift (>>) will be used extensively in this discussion. Such symbols are well known in the art. Those of ordinary skill in the art would understand that the bit shifting operations could be accomplished by other methods such as, for example, applying a scaling factor through multiplication or division. The implementations include an example of bi-directional averaging in the MPEG-4 Simple Scalable profile, an example of weighted bi-directional prediction in the Real Video 9.0 encoder, an example of weighted bi-directional averaging in the Windows Media Video 9.0 encoder, and an example of general weighted bi-directional prediction in H.264. These are only examples of implementations of weighted bi-directional prediction that can be decoded by utilizing the disclosed methods. As those of ordinary skill in the art can appreciate, other implementations of bi-directional prediction can be accommodated without departing from the spirit or scope of the disclosed methods.

MPEG-4 Implementation

There is no support for B Frames in the MPEG-4 Simple Profile. However, in order to support limited scalability, the MPEG-4 Simple Scalable Profile does support B Frames. The following averaging mechanism is used to combine predictions from two reference frames:

$$\text{pred}_{ij} = (\text{pred1}_{ij} + \text{pred2}_{ij} + 1) >> 1 \quad (5)$$

where $\text{pred1}_{ij}$ and $\text{pred2}_{ij}$ are 8-bit luminance and chrominance samples from prediction blocks from two reference frames (one past, one future) and $\text{pred}_{ij}$ is the resultant prediction which is used in picture reconstruction to add to the decoded inverse-transform of the residual error. As can be seen, there is no weighted prediction in the MPEG-4 Simple Scalable Profile implementation of B Frames.

RV9 Implementation

Real Video 9.0 (RV9) is a popular encoder that supports B Frames. The following equation is used in the RV9 implementation to compute the resultant prediction for use in B-frames:

$$\text{pred}_{ij} = ((((\text{pred1}_{ij} << 7)w_1) >> 16 + ((\text{pred2}_{ij} << 7)w_2) >> 16) + 16) >> 5 \quad (6)$$

where $\text{pred1}_{ij}$ and $\text{pred2}_{ij}$ are 8-bit luminance and chrominance samples from prediction blocks from the two reference frames (one past, one future) and $\text{pred}_{ij}$ is the resultant prediction which will be used in picture reconstruction to add to the decoded inverse-transform of the residual error. In the RV9 implementation, the weights $w_1$ and $w_2$ are 14-bit unsigned weights (with a range from 0 to 16383) to be multiplied to the individual predictions $pred1_{ij}$ and $pred2_{ij}$.

In direct mode bi-directional prediction, where the motion vectors are not transmitted for the macroblock, but can be derived from the motion vector of a co-located macroblock of the future reference frame, $w_1$ and $w_2$ are computed as relative temporal positions of the B frame with respect to the two reference frames as discussed above. For direct mode as discussed above and depicted in FIG. 5, the weights used in (6) are computed as follows:

$$w_1 = (T_B << 14)/T_D \tag{7}$$

$$w_2 = ((T_D - T_B) << 14)/T_D \tag{8}$$

where $T_B$ is the temporal distance between the current frame and the previous reference frame and $T_D$ is the temporal distance between the previous reference frame and the subsequent reference frame.

The simple averaging method of MPEG-4 (5) can be emulated with (6) by setting $w_1$ and $w_2$ both equal to 8192, which is equivalent to one half in 14-bit representation.

WMV9 Implementation

Windows Media Video 9.0 (WMV9) is another popular video encoder that supports B Frames. WMV9 implements B Frames similarly to MPEG-4 with (5) above, where $pred1_{ij}$ and $pred2_{ij}$ are the 8-bit luminance and chrominance samples from prediction blocks from the two reference frames (one past, one future) and $pred_{ij}$ is the resultant prediction which will be used in picture reconstruction to add to the decoded inverse-transform of the residual error. Thus, the WMV9 averaging process is same as in MPEG-4.

H.264 Implementation

The H.264 video compression standard offers weighted and non-weighted prediction for both single directional and bi-directional predicted regions. Weighted prediction is invoked in H.264 by setting one or both variables "predFlagL0" and "predFlagL1" equal to 1. When weighted prediction is not invoked, or when "predFlagL0=0" and "predFlagL1=0", a simple averaging like MPEG-4 above is carried out as follows:

$$Final\_pred = (pred0 + pred1 + 1) >> 1 \tag{8}$$

where pred0 and pred1, are 8-bit luminance and chrominance (also known as luma and chroma) samples from prediction blocks from the two reference frames (one past, one future) and Final_pred is the resultant prediction which will be used in picture reconstruction to add to the decoded inverse-transform of the residual error.

If only one of the two reference partitions is to be weighted, the final predicted sample values are derived as follows:
Case 1: If predFlagL0=1 and predFlagL1=0
if (logWD>=1)

$$Final\_pred = Clip1[(((pred0)w0 + 2^{logWD-1}) >> logWD) + o_0] \tag{9a}$$

else $$Final\_pred = Clip1[((pred0)w0) + o_0] \tag{9b}$$

Case 2: If predFlagL0=0 and predFlagL1=1
if (logWD>=1)

$$Final\_pred = Clip1[(((pred1)w1 + 2^{logWD-1}) >> logWD) + o_1] \tag{10a}$$

else $$Final\_pred = Clip1[((pred1)w1) + o_1] \tag{10b}$$

where descriptions, bit size and range of values for the variables are given in Table 1. Case 1 above results in weighted forward P Frame prediction and Case 2 results in weighted backward P Frame prediction. The additive offsets $o_0$ and $o_1$ are not offered in the other weighted prediction implementations listed above. The Clip1[ ] function is defined as follows:

$$Clip1(x) = Clip3(0, 255, x) \tag{11}$$

$$Clip3(x, y, z) = \begin{cases} x; & z < x \\ y; & z > y \\ z; & \text{otherwise} \end{cases} \tag{12}$$

If both of the two reference partitions are to be weighted, the final predicted sample values are derived as follows:
Case 3: If predFlagL0=1 and predFlagL1=1

$$Final\_pred = Clip1[(((pred0)w0 + (pred1)w1 + 2^{logWD}) >> (logWD+1)) + ((o_0 + o_1 + 1) >> 1)] \tag{13}$$

where descriptions, bit size and range of values for the variables are given in Table 1.

TABLE 1

| Variables | Description | Range | No. of Bits |
|---|---|---|---|
| logWD | The base 2 logarithm of the denominator for all the luma or all the chroma weighting factors (luma and chroma weighting factors can be derived separately) | 0 to 7 | 3 |
| w0 | The weighting factor applied to the luma or chroma prediction value for the first reference picture (list "0") | −128 to 127 | 8 |
| w1 | The weighting factor applied to the luma or chroma prediction value for the second reference picture (list "1") | −128 to 127 | 8 |
| $o_0$ | The additive offset applied to the luma or chroma prediction value for the first reference picture (list "0") | −128 to 127 | 8 |
| $o_1$ | The additive offset applied to the luma or chroma prediction value for the first reference picture (list "0") | −128 to 127 | 8 |

Both luma and chroma (both $C_b$ and $C_r$) sample values are evaluated using the above equations (9), (10) and (13). The weight variables w0, w1 and logWD are derived separately for the luma parameters and separately for the chroma parameters.

A Single Implementation Satisfying MPEG-4, RV9, WMV9 and H.264

The four implementations presented above are all widely used and accepted forms of video compression. As shown, each one implements weighted prediction in its own way, some of which differ greatly. Equation (18), below, is an example of a universal formula that is used by embedded hardware, such as a microprocessor of a decoder device such as decoder 155 of FIG. 1 to decode weighted prediction frames encoded in any of the four implementations. Such a universal formula processes video compressed data in any of the standard formats with minimal pre-processing and maximum reuse of software, firmware or hardware. To implement the universal formula, universal weight prediction factors having a specific bit configuration must be derived from the different weight factors utilized by the different compression standards.

In this example, an external DSP or other type of processor such as a pre-processor modifies the encoded weight parameters to the universal weight parameters. The calculations performed by the pre-processor to derive the universal weight parameters by modifying the encoded weight parameters are described below with respect to equation sets (19)-(21). What is presented below, in equations (14)-(17), is the derivation of a universal equation (18) for decoding predicted frames.

The H.264 implementation is the most complicated and makes a good starting point. The three cases represented by equations (9), (10) and (13) above can be simplified to one equation, with proper manipulation of the weighting factor variables and offset variables, as follows $$\text{Final\_pred} = \text{Clip1}[((\text{pred0})w0 + (\text{pred1})w1 + 2^{LWD-1}) >> (LWD)) + ((o_0 + o_1 + 1) >> 1)] \quad (14)$$

where the variables LWD, w0, w1, o0 and o1 are defined as follows for the three cases:

For case 1: w1=0, and w0 is determined by the encoder
$o_1$=0, and $o_0$ is determined by the encoder
LWD=logWD For case 2: w0=0, and w1 is determined by the encoder
$o_0$=0, and $o_1$ is determined by the encoder
LWD=logWD For case 3: LWD=logWD+1
w0, w1, $o_0$ and $o_1$ are determined by the encoder Using the bit sizes listed in Table 1, the bitwidth deduction in Table 2 shows that equation (14) results in an 8 bit value for the weighted prediction samples.

TABLE 2

| Operation No. | Operation | Bitwidths Involved | Bitwidth of Operation Result |
|---|---|---|---|
| 1 | (pred0)w0, (pred1)w1 | 8 bits * 8 bits | 16 |
| 2 | $2^{LWD-1}$ | logWD has a maximum value of 7, therefore LWD − 1 has a maximum value of 7 for case 3 | 7 |
| 3 | (pred0)w0 + (pred1)w1 + $2^{LWD-1}$ | 16 bits + 16 bits + 7 bits | 18 |
| 4 | (((pred0)w0 + (pred1)w1 + $2^{logWD}$) >> (LWD + 1)) | (18 bits) >> (8 bits)* *maximum value of LWD + 1 | 10 |
| 5 | ($o_0 + o_1$ + 1) >> (1) | (8 bits + 8 bits + 1) >> (1) | 8 |
| 6 | Clip1[Op. 4 + Op. 5] (for Clip1, see Eq. (11)) | Clip1[10 bits + 8 bits] | 8 |

Equation (14) can be modified to eliminate the variable bit shift of LWD bits. Modifying the weights w0 and w1 and having an external digital signal processor (DSP) or other type of processor program modified weight parameters w0' and w1'. Since LWD has a maximum value of 8, modifying the weights can be accomplished, while keeping the argument of all bit shift operations positive, by multiplying each of the terms in Op. 3 of Table 2 by $2^{8-LWD}$ and increasing the right bit shift of Op. 4 in Table 2 by (8−LWD) bits as follows:

$$\text{Final\_pred} = \text{Clip1}[(((\text{pred0})w0*2^{8-LWD} + (\text{pred1})w1*2^{8-LWD} + 2^7) >> (8)) + ((o_0 + o_1 + 1) >> 1)] \quad (15)$$

Replacing the weights w0 and w1 with modified weights results in:

$$\text{Final\_pred} = \text{Clip1}[(((\text{pred0})w0' + (\text{pred1})w1' + 2^7) >> 8) + ((o_0 + o_1 + 1) >> 1)] \quad (16)$$

where w0'=w0<<(8−LWD) and w1'=w1<<(8−LWD)

Cases 1, 2 and 3, listed above in equations 9, 10 and 13, can be handled using equation (16) with the following variables defined by a DSP or other pre-processor:

For Case 1: $\begin{cases} w1' = w1 = 0 \\ o_1 = 0 \\ LWD = \log WD \end{cases}$ For Case 2: $\begin{cases} w0' = w0 = 0 \\ o_0 = 0 \\ LWD = \log WD \end{cases}$ For Case 3: $LWD = \log WD + 1$ In addition to the pre-processor performing a left-bit-shift on the modified weights, it can also increase the number of bits of the weights. This can be done to ensure compatibility with multiple implementations. The DSP or pre-processor can zero-extend the weights in the case of unsigned variables as in the RV9 implementation or sign-extend in the case of signed variables as in the H.264 implementation. Table 3 shows the resulting bitwidth deduction for the variables and operations of equation (16) using 8 bit signed weights, where the weights are sign extended to 9 bits. The offset operation number 4 in Table 3 can also be performed in a pre-processor.

TABLE 3

| Operation No. | Operation | Bitwidths Involved | Bitwidth of Operation Result |
|---|---|---|---|
| 1 | (pred0)w0', (pred1)w1' | 8 bits * 9 bits | 17 |
| 2 | (pred0)w0' + (pred1)w1' + $2^7$ | 17 bits + 17 bits + 7 bits | 19 |
| 3 | (((pred0)w0' + (pred1)w1' + $2^7$) >> (8)) | (19 bits) >> (8 bits) | 11 |
| 4 | ($o_0 + o_1$ + 1) >> (1) | (8 bits + 8 bits + 1) >> (1) | 8 |
| 5 | Clip1[Op. 3 + Op. 4] (for Clip1, see Eq. (11)) | Clip1[11 bits + 8 bits] | 8 |

Equation 16, with the bitwidths shown in Table 3 and the encoded variables shown in Table 1, can be implemented in a microprocessor and used to implement all of the weighted bi-directional prediction implementations presented above except the RV9 implementation. Further modifications to equation (16) are needed to support the 14 bit unsigned weights of RV9.

The weights w0' and w1' in equation (16) can be left shifted 6 bits in order to match the 14 bit bitwidths of the RV9 weights, resulting in:

$$\text{Final\_pred} = \text{Clip1}[(((( \text{pred0})w0'<<6)>>6 + ((\text{pred1})w1'<<6)>>6 + 27)>>8) + ((o_0 + o_1 + 1)>>1)] \quad (17)$$

which can be represented as follows:

$$pred_{ij} = ((((pred0)w_A) \gg 6 + ((pred1)w_B) \gg 6) + 2^7) \gg 8 + \text{Offset} \quad (18)$$

where $w_A$, $w_B$ and Offset can be calculated by the pre-processor based on what implementation was used to encode the weight parameters (see pre-processor calculations below). Table 4 shows an example of a bitwidth deduction for the variables and operations of equation (18) using 15 bit weights $w_A$ and $w_B$ and 8 bit offsets that can accommodate all of the examples of weighted prediction described above.

TABLE 4

| Operation No. | Operation | Bitwidths Involved | Bitwidth of Operation Result |
|---|---|---|---|
| 1 | (pred0) $w_A$, (pred1) $w_B$ | 8 bits * 15 bits | 23 |
| 2 | ((pred0) $w_A$) >> 6 + ((pred1)$w_B$) >> 6 + $2^7$ | 17 bits + 17 bits + 7 bits | 19 |
| 3 | (((pred0) $w_A$) >> 6 + ((pred1)$w_B$) >> 6 + $2^7$) >> (8) | (19 bits) >> (8 bits) | 11 |
| 4 | ($o_0 + o_1 + 1$) >> (1) | (8 bits + 8 bits + 1) >> (1) | 8 |
| 5 | Clip1[Op. 3 + Op. 4] (for Clip1, see Eq. (11)) | Clip1[11 bits + 8 bits] | 8 |

Implementing equation 18 in embedded hardware, such as a microprocessor, and using an external DSP or other type of processor as a pre-processor for modifying the encoded weight parameters is a cost effective and efficient method of handling multiple implementations of weighted prediction. A preprocessor such as pre-processor 170 depicted in FIG. 1 and pre-processor 810 depicted in FIG. 8 could be used for modifying the encoded weight parameters. The pre-processor will perform the following calculations when modifying the encoded weight parameters, for the various implementations listed, and supply the modified variables to the embedded microprocessor:

Modified weighted prediction factors $w_A$ and $w_B$ based on H.264 encoded weighted prediction with 8 bit signed weights w0 and w1, 8 bit signed offsets $o_0$ and 01, and logWD are calculated using Equation Set (19) Below.

$$w_A = sign\_extend((w0' << 6), 15)$$

$$w_B = sign\_extend((w1' << 6), 15)$$

$$\text{Offset} = (o_0 + o_1 + 1) >> 1$$

$$w0' = w0 << (8 - LWD)$$

$$w1' = w1 << (8 - LWD) \quad \text{Equation Set (19):}$$

where LWD, w0 and w1 depend on the 3 Cases as described above and listed in equations (9), (10) and (13):

For case 1: w1=0, and w0 is determined by the encoder
$o_1$=0, and $o_0$ is determined by the encoder
LWD=logWD which is determined by the encoder
The encoder determines pred0.

For case 2: w0=0, and w1 is determined by the encoder
$o_0$=0, and $o_1$ is determined by the encoder
LWD=logWD which is determined by the encoder
The encoder determines pred1.

For case 3: LWD=logWD+1
The encoder determines pred0, pred1, LogWD, $w_0$, $w_1$, $o_0$ and $o_1$.

Modified weighted prediction factors $w_A$ and $w_B$ based on RV9 encoded weighted prediction with 14 bit unsigned weights w1 and w2 calculated using Equation Set (20) below.

$$w_A = zero\_extend(w1, 15)$$

$$w_B = zero\_extend(w2, 15)$$

$$\text{Offset} = 0$$

$$\text{pred0} = \text{pred1}_{ij}$$

$$\text{pred1} = \text{pred2}_{ij} \quad \text{Equation Set (20):}$$

Modified weighted prediction factors $w_A$ and $w_B$ based on WMV9 or MPEG-4 encoded simple averaged prediction are calculated using Equation Set (21) below.

$$w_A = zero\_extend(16383, 15)$$

$$w_B = zero\_extend(16383, 15)$$

$$\text{Offset} = 0$$

$$\text{pred0} = \text{pred1}_{ij}$$

$$\text{pred1} = \text{pred2}_{ij} \quad \text{Equation Set (21):}$$

As one of ordinary skill in the art will recognize, other weighted prediction implementations could be implemented in a similar manner. The bit configuration of the weight variables $w_A$ and $w_B$ in Equation (18) could be chosen to be larger to accommodate more than 14 bit encoded weights. The bit configuration of the weight variables $w_A$ and $w_B$ in Equation (18) could be chosen to be smaller than 14 bits if loss of the lower bits is acceptable. Also, different sized offsets could be accommodated in a similar manner. As was shown above, both signed and unsigned variables can be accommodated as well. Bit configuration choosing means such as pre-processor module 170 of FIG. 1 can be used to choose the appropriate bit configuration necessary to accommodate weight variables and offsets with multiple encoded bit configurations.

Figure 8:
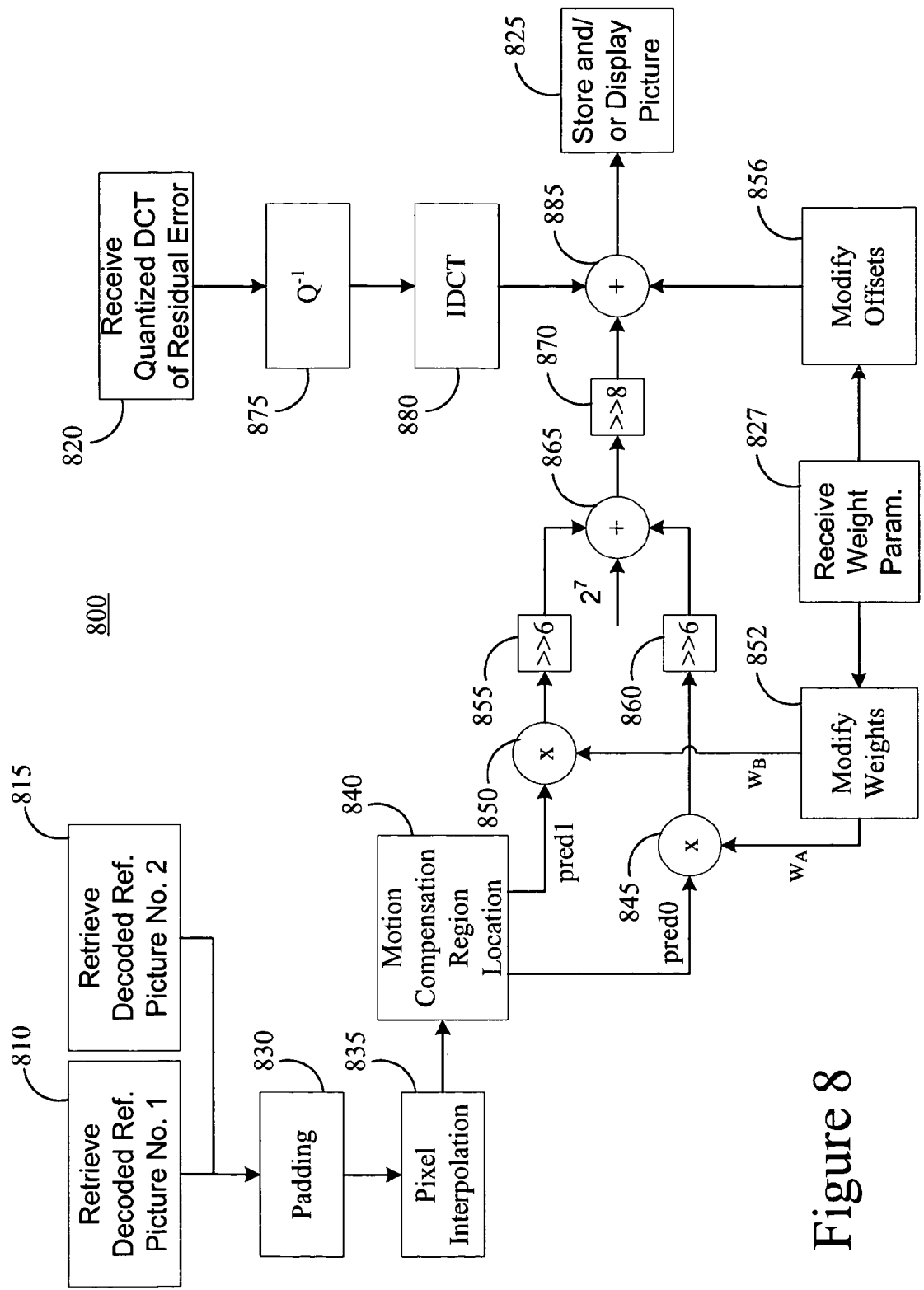
FIG. 8 is a flow chart of an example of a decoder process for decoding multiple encoder implementations of weighted bi-directional predicted video data.

FIG. 8 is a flow chart of an example of a decoder process for decoding multiple encoder implementations of weighted bi-directional predicted video data. Process 800 could be carried out with a device such as decoder device 155 depicted in FIG. 1. The process is carried out by three main components including predictive decoding component 165, pre-processor component 170 such as a DSP that is external to the predictive decoding component 165 and at least one memory module 175 to store various data. The combination of a predictive decoding component 165 and external pre-processor component 170 allows for simple hardware design of the microprocessor that can perform several examples of weighted prediction with implementation specific calculations done in the pre-processor depending on the encoder implementation that is being decoded.

The decoder device receives encoded video data over a network, such as network 150 of FIG. 1, or from external memory such as external storage component 180 of FIG. 1. Receiving means such as communications component 190 of FIG. 1 can perform the receiving task. Decoding of an inter-coded picture can start when the reference picture or pictures are already decoded and stored in memory such as memory module 175 in FIG. 1. There will be only one reference frame (either past or future) when doing Case 1 or Case 2 in the H.264 Implementation as presented above. When doing bi-directional predicted decoding, both past and future reference pictures are stored in memory. Retrieving steps 810 and 815 access the first reference picture (a past reference picture, for example) and the second reference picture (a future reference picture, for example), respectively, from memory. Padding the border edges of the decoded pictures with zeroes (reflection can also be used) is done in preparation for pixel interpolation. The act of padding in step 830 allows for multiple tapped filters to correctly interpolate between border area pixels where an insufficient number of pixels exist. Pixel interpolation, step 835, is used to achieve better matching reference regions for motion compensation. An encoder can perform pixel interpolation to locate the best matching reference macroblock (or any size section) and point to the pixel or interpolated pixel with a motion vector. In the case of bi-directional prediction, there are two motion vectors. Also, when utilizing the direct mode as discussed above, the decoder calculates the motion vectors through temporal interpolation of a motion vector of a co-located macroblock in the future reference picture. The decoder uses the motion vectors to perform motion compensation region location, step 840, to locate the best matching regions among the interpolated pixels. Pixel interpolation, step 835, will be discussed in more detail below. The luma and chroma values of the two best matching prediction regions, pred0 and pred1, output at step 840, are multiplied, steps 845 and 850, by modified weights $w_A$ and $w_B$ respectively (weight modification is discussed below). After applying the weights, both weighted regions are right bit-shifted 6 bits, steps 855 and 860, and added, step 865, to the rounding factor 27 and then right bit shifted 8 bits, step 870, to form the combined weighted prediction. Calculating means such as predictive decoding module 165 of FIG. 1 can perform the multiplication steps 845 and 850, the bit shift steps 855, 860 and 870, and the addition step 865 for calculating the combined weighted prediction. The quantized residual error DCT coefficients corresponding to the weighted prediction regions is received over a network or from external storage, step 820. Performing inverse quantization, step 875, and performing the Inverse Transform, step 880, (such as, for example, an inverse DCT or an inverse wavelet transform) results in the decoded residual error, which is added, step 885, to the combined weighted prediction and the preprocessor modified offset (offset modification is discussed below) to form an output picture. Residual error and offset combining means such as predictive decoding module 165 of FIG. 1 can perform addition step 885. The output picture can be stored in memory and/or displayed on display means such as display component 185 in FIG. 1, step 825.

Weight parameters corresponding to the weighted prediction regions are received, step 827. A pre-processor such as pre-processor component 170 in FIG. 1 is used to modify received encoded weights $W_A$, and $w_B$ to match the bit configuration of the universal weight prediction factors that the embedded microprocessor code was designed for, step 852. The pre-processor is also used to modify any received offset(s), step 856, that the embedded microprocessor will use such that the offsets conform to the bit configuration that the embedded microprocessor code was designed for. The modifications will be dependent on which form of weighted prediction was used to encode the data (example modifications listed in Equation Sets (19)-(21) above). The pre-processor can receive a flag from an input bit stream identifying the type of encoded data that it is receiving (such as, for example H.264, RV9, WMV9 or MPEG-4 encoded video data). The encoder dependent modifications to the weights and offsets are discussed above in relationship to equation 18 which is the example depicted in FIG. 8. Modifying means such as pre-processor module 170 of FIG. 1 can perform the modifications to the weights and offsets. When one of the weights is zero, such as in Case 1 or Case 2 in the H.264 Implementation as presented above, zero weight identifying means such as pre-processor module 170 of FIG. 1 sets the corresponding weight parameter to zero.

In some circumstances, a video encoder might specify a null region for a macroblock during motion compensation analysis. A null region refers to the absence of a reference picture for the macroblock under consideration. Weighted prediction logic can check a reference list ID for the presence and relationship of the reference pictures. In the case of a null region, null region locating and identifying means such as pre-processor module 170 of FIG. 1 can set the corresponding weight to zero or perform other operations known to those of ordinary skill in the art to handle the null region scenario.

Figure 9:
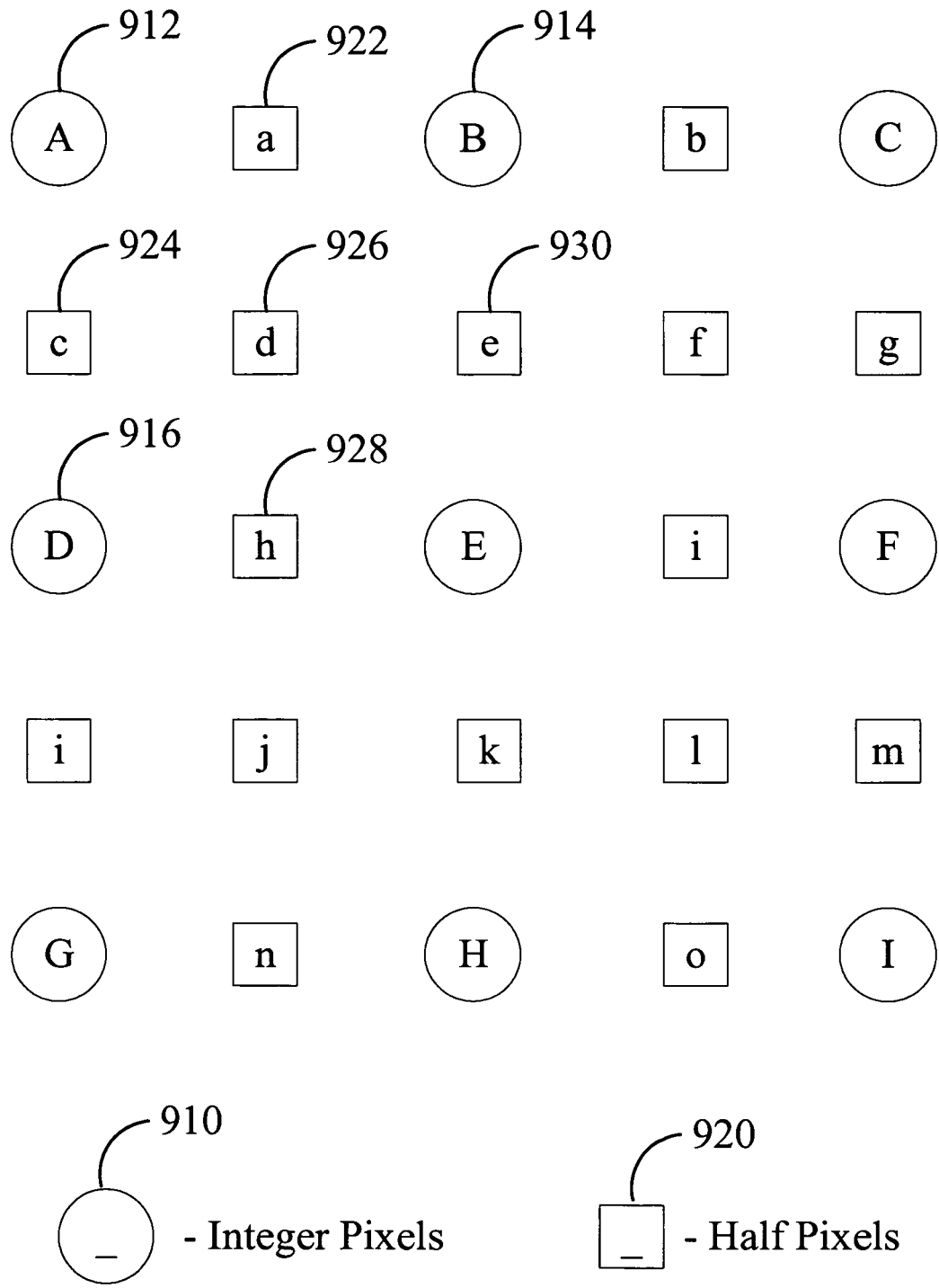
FIG. 9 is an illustration of an example of half-pixel interpolation for use in motion compensation.
Figure 10:
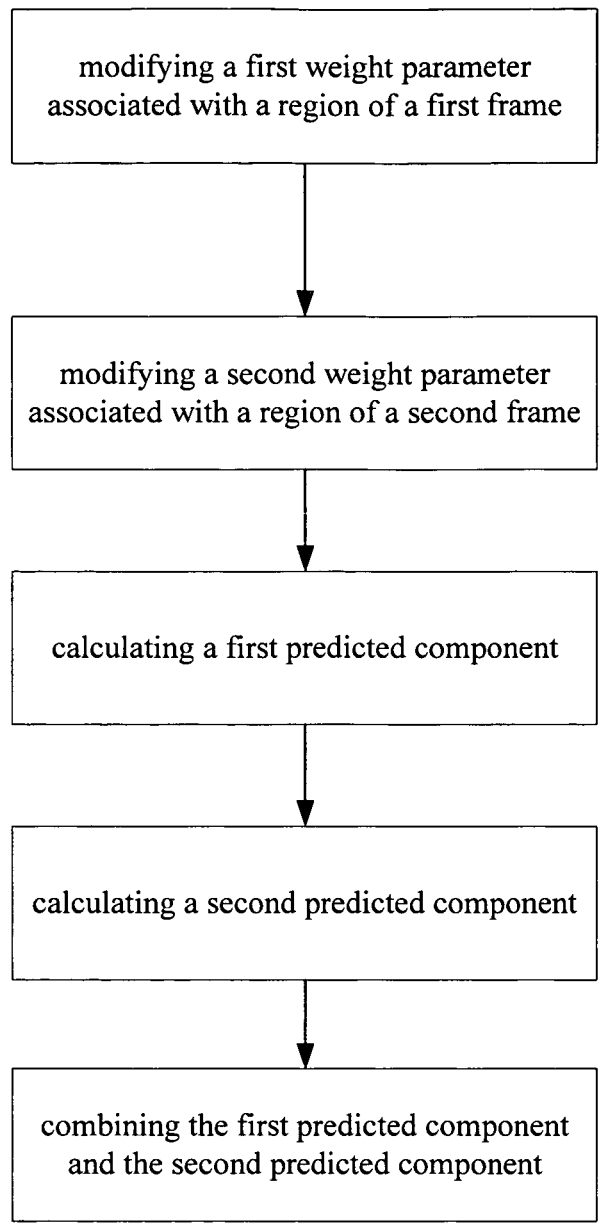
FIG. 10 is a flow chart according to one embodiment.

Pixel interpolation can be used to improve the performance of motion compensated predictive coding. FIG. 9 is an illustration of an example of half-pixel interpolation for use in motion compensation. The example shown is half pixel interpolation where one interpolated pixel is located between each of the original integer pixels. Integer pixels 910 are depicted as circles labeled upper case "A" to "I" and the interpolated or half-pixels 920 are depicted as squares labeled lower case "a" to "o". Half pixel interpolation can be carried out with a bilinear filter such as, for example, a 2-tap FIR filter with weights [0.5 0.5]. For example, interpolated pixel 922 can be calculated as the average of integer pixel 912 and integer pixel 914, interpolated pixel 924 can be the average of integer pixel 912 and integer pixel 916, and interpolated pixel 926 can be the average of two interpolated pixels (for example, 922 and 928 or 924 and 930). Both the luminance (Y) and chrominance (Cr and Cb) components can be interpolated in this fashion. Other orders of pixel interpolation are supported by various standards. H.264 supports quarter pixel interpolation as well as eighth pixel interpolation. Those of ordinary skill in the art would understand these other pixel interpolation methods and they are not discussed in greater detail herein. FIG. 10 is a flow chart according to one embodiment. The chart begins in the first block by modifying a first weight parameter associated with a region of a first frame. In the next block, the process modifies a second weight parameter associated with a region of a second frame. Next, the process calculates a first predicted component. Subsequently, the process calculates a second predicted component. Last, the process combines the first predicted component and the second predicted component.

Examples of the embodiments described above include:

A method for constructing a predicted picture, that includes: modifying a first weight parameter associated with a region of a first frame to conform to a bit configuration, modifying a second weight parameter associated with a region of a second frame to conform to the bit configuration, calculating a first predicted component by applying the modified first weight parameter to the region of the first frame, calculating a second predicted component by applying the modified second weight parameter to the region of the second frame, and calculating a combined weighted prediction by combining the first predicted component and the second predicted component.

An apparatus for constructing a predicted picture, that includes: means for modifying a first weight parameter associated with a region of a first frame to conform to a bit configuration, means for modifying a second weight parameter associated with a region of a second frame to conform to the bit configuration, means for calculating a first predicted component by applying the modified first weight parameter to the region of the first frame, means for calculating a second predicted component by applying the modified second weight parameter to the region of the second frame, and means for calculating a combined weighted prediction by combining the first predicted component and the second predicted component.

An electronic device for constructing a predicted picture, the electronic device configured to modify a first weight parameter associated with a region of a first frame to conform to a bit configuration, to modify a second weight parameter associated with a region of a second frame to conform to the bit configuration, to calculate a first predicted component by applying the modified first weight parameter to the region of the first frame, to calculate a second predicted component by applying the modified second weight parameter to the region of the second frame, and to calculate a combined weighted prediction by combining the first predicted component and the second predicted component.

A computer-readable medium embodying means for causing a computer to execute a method for constructing a predicted picture, the method includes: modifying a first weight parameter associated with a region of a first frame to conform to a bit configuration, modifying a second weight parameter associated with a region of a second frame to conform to the bit configuration, calculating a first predicted component by applying the modified first weight parameter to the region of the first frame, calculating a second predicted component by applying the modified second weight parameter to the region of the second frame, and calculating a combined weighted prediction by combining the first predicted component and the second predicted component.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed examples. Various modifications to these examples will be readily apparent to those skilled in the art, and the principles defined herein may be applied to other examples without departing from the spirit or scope of the disclosed methods.

Thus, a method, apparatus and system to reconstruct weighted bi-directional predicted video data that has been encoded with different implementations of weighted bi-directional prediction have been described.

What is claimed is:

1. A method for decoding video data, the method comprising:
    modifying a first weight parameter to conform to a bit configuration of universal weight prediction factors;
    modifying a second weight parameter to conform to the bit configuration, wherein the modification of the first weight parameter and the modification of the second weight parameter are dependent on a form of weighted prediction used to encode the video data; and
    using a formula to determine a sample of a combined weighted prediction, wherein parameters of the formula include a sample from a prediction block of a first reference picture, the modified first weight parameter, a sample from a prediction block of a second reference picture, and the modified second weight parameter, wherein the formula is used in processing of compressed video data in any of a plurality of encoding standards, wherein each respective encoding standard from the plurality of encoding standards implements a different form of weighted prediction.

2. The method of claim 1, wherein at least two of the plurality of encoding standards employ encoded bit configurations having different numbers of bits.

3. The method of claim 1, wherein at least one of the plurality of encoding standards employs a signed encoded bit configuration and at least one of the plurality of encoding standards employs an unsigned encoded bit configuration.

4. The method of claim 1, further comprising:
    locating the prediction block of the first reference picture using a first motion vector; and
    locating the prediction block of the second reference picture using a second motion vector.

5. The method of claim 1, further comprising:
    locating the prediction block of the first reference picture and locating the prediction block of the second reference picture by using direct mode temporal interpolation of a decoded motion vector between the first reference picture and the second reference picture.

6. The method of claim 1, further comprising:
    locating the prediction block of the first reference picture by identifying that the prediction block of the first reference picture is a null region; and
    setting the first weight parameter to zero.

7. The method of claim 1, further comprising:
    locating the prediction block of the second reference picture by identifying that the prediction block of the second reference picture is a null region; and
    setting the second weight parameter to zero.

8. The method of claim 1, wherein the first weight parameter and the second weight parameter are a same encoded bit configuration.

9. The method of claim 1, wherein the first weight parameter and the second weight parameter are signed.

10. The method of claim 1, further comprising:
normalizing the combined weighted prediction by bit shifting the combined weighted prediction a number of bits based on a base two logarithm of a denominator associated with the first weight parameter and the second weight parameter.

11. The method of claim 1, further comprising:
receiving a first offset parameter associated with a region of the first reference frame;
receiving a second offset parameter associated with a region of the second reference frame;
receiving a residual error associated with the combined weighted prediction; and
combining the residual error, the first offset parameter and the second offset parameter with the combined weighted prediction.

12. The method of claim 1, further comprising:
receiving encoded video data representing the first weight parameter and the second weight parameter over a network.

13. The method of claim 1, further comprising:
receiving encoded video data representing the first weight parameter and the second weight parameter over a wireless network.

14. The method of claim 1, further comprising:
adding a decoded residual error to the combined weighted prediction to form an output picture; and
displaying the output picture.

15. The method of claim 1, further comprising:
modifying the first weight parameter by performing an operation selected from the group consisting of bit shifting, sign extending, zero extending and applying a scaling factor; and
modifying the second weight parameter by performing an operation selected from the group consisting of bit shifting, sign extending, zero extending and applying a scaling factor.

16. An apparatus for decoding video data, the apparatus comprising:
means for modifying a first weight parameter to conform to a bit configuration of universal weight prediction factors;
means for modifying a second weight parameter to conform to the bit configuration, wherein the modification of the first weight parameter and the modification of the second weight parameter are dependent on a form of weighted prediction used to encode the video data;
means for using a formula to determine a sample of a combined weighted prediction, wherein parameters of the formula include a sample from a prediction block of a first reference picture, the modified first weight parameter, a sample from a prediction block of a second reference picture, and the modified second weight parameter, wherein the formula is used in processing of compressed video data in any of a plurality of encoding standards, wherein each respective encoding standard from the plurality of encoding standards implements a different form of weighted prediction.

17. The apparatus of claim 16, wherein at least two of the plurality of encoding standards employ encoded bit configurations having different numbers of bits.

18. The apparatus of claim 16, wherein at least one of the plurality of encoding standards employs a signed encoded bit configuration and at least one of the plurality of encoding standards employs an unsigned encoded bit configuration.

19. The apparatus of claim 16, further comprising:
means for locating the prediction block of the first reference picture by using a motion vector.

20. The apparatus of claim 16, further comprising:
means for locating the prediction block of the second reference picture by using a motion vector.

21. The apparatus of claim 16, further comprising:
means for locating the prediction block of the first reference picture and locating the prediction block of the second reference picture by using direct mode temporal interpolation of a decoded motion vector between the first reference picture and the second reference picture.

22. The apparatus of claim 16, further comprising:
means for locating the prediction block the first reference picture by identifying that the prediction block of the first reference picture is a null region; and
means for setting the first weight parameter to zero.

23. The apparatus of claim 16, further comprising:
means for locating the prediction block of the second reference picture by identifying that the prediction block of the second reference picture is a null region; and
means for setting the second weight parameter to zero.

24. The apparatus of claim 16, wherein the first weight parameter and the second weight parameter are a same encoded bit configuration.

25. The apparatus of claim 16, wherein the first weight parameter and the second weight parameter are signed.

26. The apparatus of claim 16, further comprising:
means for normalizing the combined weighted prediction.

27. The apparatus of claim 16, further comprising:
means for normalizing the combined weighted prediction by bit shifting the combined weighted prediction a number of bits based on a base two logarithm of a denominator associated with the first weight parameter and the second weight parameter.

28. The apparatus of claim 16, further comprising:
means for receiving a first offset parameter associated with the prediction block of the first reference picture;
means for receiving a second offset parameter associated with the prediction block of the second reference picture; and
means for combining the first offset parameter and the second offset parameter with the combined weighted prediction.

29. The apparatus of claim 16, further comprising:
means for receiving a residual error associated with the combined weighted prediction; and
means for combining the residual error with the combined weighted prediction.

30. The apparatus of claim 16, further comprising:
means for receiving encoded video data representing the first weight parameter and the second weight parameter over a network.

31. The apparatus of claim 16, further comprising:
means for receiving encoded video data representing the first weight parameter and the second weight parameter over a wireless network.

32. The apparatus of claim 16, further comprising:
adding a decoded residual error to the combined weighted prediction to form an output picture; and
means for displaying the output picture.

33. The apparatus of claim 16, further comprising:
means for modifying the first weight parameter by bit shifting; and
means for modifying the second weight parameter by bit shifting.

34. The apparatus of claim 16, further comprising:
means for modifying the first weight parameter by sign extending; and
means for modifying the second weight parameter by sign extending.

35. The apparatus of claim 16, further comprising:
means for modifying the first weight parameter by zero extending; and
means for modifying the second weight parameter by zero extending.

36. The apparatus of claim 16, further comprising:
means for modifying the first weight parameter by applying a scaling factor; and
means for modifying the second weight parameter by applying a scaling factor.

37. An electronic device for decoding video data, the electronic device configured to:
modify a first weight parameter to conform to a bit configuration of universal weight prediction factors;
modify a second weight parameter to conform to the bit configuration, wherein the modification of the first weight parameter and the modification of the second weight parameter are dependent on a form of weighted prediction used to encode the video data; and
use a formula to determine a sample of a combined weighted prediction, wherein parameters of the formula include a sample from a prediction block of a first reference picture, the modified first weight parameter, a sample from a prediction block of a second reference picture, and the modified second weight parameter, wherein the formula is used in processing of compressed video data in any of a plurality of encoding standards, wherein each respective encoding standard from the plurality of encoding standards implements a different form of weighted prediction.

38. The electronic device of claim 37, wherein at least two of the plurality of encoding standards employ encoded bit configurations having different numbers of bits.

39. The electronic device of claim 37, wherein at least one of the plurality of encoding standards employs a signed encoded bit configuration and at least one of the plurality of encoding standards employs an unsigned encoded bit configuration.

40. The electronic device of claim 37, further configured to locate the prediction block of the first reference picture using a motion vector.

41. The electronic device of claim 37, further configured to locate the prediction block of the second reference picture using a motion vector.

42. The electronic device of claim 37, further configured to locate the prediction block of the first reference picture and to locate the prediction block of the second reference picture by using direct mode temporal interpolation of a decoded motion vector between the first reference picture and the second reference picture.

43. The electronic device of claim 37, further configured to:
locate the prediction block of the first reference picture by identifying that the prediction block of the first reference picture is a null region, and
set the first weight parameter to zero.

44. The electronic device of claim 37, further configured to:
locate the prediction block of the second reference picture by identifying that the prediction block of the second reference picture is a null region, and
set the second weight parameter to zero.

45. The electronic device of claim 37, wherein the first weight parameter and the second weight parameter are a same encoded bit configuration.

46. The electronic device of claim 37, wherein the first weight parameter and the second weight parameter are signed.

47. The electronic device of claim 37, further configured to normalize the combined weighted prediction.

48. The electronic device of claim 37, further configured to normalize the combined weighted prediction by bit shifting the combined weighted prediction a number of bits based on a base two logarithm of a denominator associated with the first weight parameter and the second weight parameter.

49. The electronic device of claim 37, further configured to receive a first offset parameter associated with a region of the first and a second offset parameter associated with a region of the second frame, and to combine the first offset parameter and the second offset parameter with the combined weighted prediction.

50. The electronic device of claim 37, further configured to receive a residual error associated with the combined weighted prediction, and to combine the residual error with the combined weighted prediction.

51. The electronic device of claim 37, further configured to receive encoded video data representing the first weight parameter and the second weight parameter over a network.

52. The electronic device of claim 37, further configured to receive encoded video data representing the first weight parameter and the second weight parameter over a wireless network.

53. The electronic device of claim 37, further configured to:
add a decoded residual error to the combined weighted prediction to form an output picture; and
display the output picture.

54. The electronic device of claim 37, further configured to modify the first weight parameter with a bit shift and to modify the second weight parameter with a bit shift.

55. The electronic device of claim 37, further configured to modify the first weight parameter by sign extending and to modify the second weight parameter by sign extending.

56. The electronic device of claim 37, further configured to modify the first weight parameter by zero extending and to modify the second weight parameter by zero extending.

57. The electronic device of claim 37, further configured to modify the first weight parameter by applying a scaling factor and to modify the second weight parameter by applying a scaling factor.

58. A non-transitory computer-readable medium containing software for decoding video data, wherein the software, when executed, causes a computer to perform the acts of:
modifying a first weight parameter to conform to a bit configuration of universal weight prediction factors;
modifying a second weight parameter to conform to the bit configuration, wherein the modification of the first weight parameter and the modification of the second weight parameter are dependent on a form of weighted prediction used to encode the video data; and
using a formula to determine a sample of a combined weighted prediction, wherein parameters of the formula include a sample from a prediction block of a first reference picture, the modified first weight parameter, a sample from a prediction block of a second reference picture, and the modified second weight parameter, wherein the formula is used in processing of compressed video data in any of a plurality of encoding standards, wherein each respective encoding standard from the plurality of encoding standards implements a different form of weighted prediction.

59. The non-transitory computer-readable medium of claim 58, further comprising:
wherein at least two of the plurality of encoding standards employ encoded bit configurations having different numbers of bits.

60. The non-transitory computer-readable medium of claim 58, further comprising:
wherein at least one of the plurality of encoding standards employs a signed encoded bit configuration and at least one of the plurality of encoding standards employs an unsigned encoded bit configuration.

61. At least one electronic processor for decoding video data, the at least one processor configured to implement a method, the method comprising:
modifying a first weight parameter to conform to a bit configuration of universal weight prediction factors;
modifying a second weight parameter to conform to the bit configuration, wherein the modification of the first weight parameter and the modification of the second weight parameter are dependent on a form of weighted prediction used to encode the video data; and
using a formula to determine a sample of a combined weighted prediction, wherein parameters of the formula include a sample from a prediction block of a first reference picture, the modified first weight parameter, a sample from a prediction block of a second reference picture, and the modified second weight parameter, wherein the formula is used in processing of compressed video data in any of a plurality of encoding standards, wherein each respective encoding standard from the plurality of encoding standards implements a different form of weighted prediction.

62. The method of claim 1, wherein the formula comprises:

$$pred_{ij}=((((pred0)W_A)>>6+((pred1)W_B)>>6)+2^7)>>8+\text{Offset}$$

where $W_A$ comprises the modified first weight parameter, $W_B$ comprises the modified second weight parameter, Offset comprises an offset value, pred0 represents the sample from the prediction block of the first reference picture, pred1 represents the sample from the prediction block of the second reference picture, and $pred_{ij}$ represents the sample of the combined weighted prediction.

63. The method of claim 1, wherein modifying the first weight parameter to conform to the bit configuration and modifying the second weight parameter to conform to the bit configuration comprises receiving the first and second weight parameters at a preprocessor, said preprocessor performing one of a plurality of modification equations, each of said modification equations configured to reconfigure a weight parameter to the bit configuration based on at least the weight parameter's initial form.

64. The method of claim 1, wherein the plurality of encoding standards comprises H.264, MPEG-4, RV9, and WMV9 encoding standards.

* * * * *